United States Patent [19]
Fukuo et al.

[11] Patent Number: 4,721,077
[45] Date of Patent: Jan. 26, 1988

[54] CRANKSHAFT SUPPORTING STRUCTURE FOR MULTICYLINDER INTERNAL CONBUSTION ENGINES

[75] Inventors: Koichi Fukuo; Masatoshi Chosa, both of Saitama, Japan

[73] Assignee: Honda Giken Kogyo Kabushiki Kaisha, Tokyo, Japan

[21] Appl. No.: 802,583

[22] Filed: Nov. 27, 1985

[30] Foreign Application Priority Data

Nov. 28, 1984 [JP] Japan .................................. 59-250720

[51] Int. Cl.$^4$ ............................................... F02F 7/00
[52] U.S. Cl. ............................. 123/195 R; 123/195 C; 184/65
[58] Field of Search ........... 123/195 R, 195 S, 195 H, 123/195 C; 184/6.5–6.9

[56] References Cited

U.S. PATENT DOCUMENTS

| | | | |
|---|---|---|---|
| 3,769,953 | 11/1973 | Kuhn | 123/195 R |
| 3,841,203 | 10/1974 | Bruce | 123/195 H |
| 4,393,822 | 7/1983 | Obermayer et al. | 123/41.74 |
| 4,467,755 | 8/1984 | Hayashi | 123/195 R |

Primary Examiner—Craig R. Feinberg
Attorney, Agent, or Firm—Lyon & Lyon

[57] ABSTRACT

A crankshaft support for a multicylinder internal combustion engine employing a plurality of bearing caps fitted in recesses in journal walls in the cylinder block and connected by pairs of bolts extending vertically through each bearing cap into the journal wall. An additional pair of bolts extend horizontally from each side of the cylinder block to connect the skirt portions to the bearing caps. A bridge extends the length the engine over the bearing caps and is connected thereto by another pair of vertical bolts.

11 Claims, 5 Drawing Figures

CRANKSHAFT SUPPORTING STRUCTURE FOR MULTICYLINDER INTERNAL CONBUSTION ENGINES

The present invention relates to a crankshaft supporting structure for an in-line or V-shaped multicylinder internal combustion engine and, in particular, to a structural bridge and bearing cap arrangement for increasing the rigidity of the assembled engine.

In the most common conventional construction of an internal combustion engine the crankshaft is removably supported on the cylinder block by a plurality of main bearings with a like plurality of bearing caps securing the main bearings and crankshaft to the cylinder block. In such an arrangement the structural rigidity of the engine is supplied almost entirely by the cylinder block with the bearing caps adding slightly to the lateral rigidity only. Various structures have been proposed, such as shown in U.S. Pat. Nos. 3,046,954 and 3,841,203 for increasing the structural rigidity of an engine by interconnecting some or all of the bearing caps with bridge elements or the like but each of the prior proposals have had various deficiencies or disadvantages.

Automotive internal combustion engines are required in recent years to produce a high power output while assuring improved fuel economy. Conventional engine designs have however been disadvantageous in that attempts to increase the power output fail to improve the fuel economy, and better fuel economy does not lead to a larger power output.

Therefore, it is an object of the present invention to provide a crankshaft supporting structure for multicylinder internal combustion engines which increases the rigidity of the crankshaft bearing assembly and reduces the weight of the engine body while assuring a higher engine power output without reducing the fuel economy.

Another object of this invention is to provide such a structure wherein side skirt portions of the cylinder block are bolted to the crankshaft bearing caps and a bridge extends longitudinally of the engine and is fastened to the bearing caps and journal walls for maximizing rigidity of the engine. A still further object is to provide such a structure wherein the bearing caps are fitted in recesses in the journal walls.

According to the present invention, there is provided a crankshaft supporting structure in an internal combustion engine, including a plurality of journal walls integral with the crankcase of a cylinder block and a plurality of bearing caps fastened to the journal walls rotatably supporting the crankshaft wherein the crankcase has a pair of skirt walls extending downwardly and integral with each of the journal walls on either side of the crankshaft with the journal walls and the skirt walls jointly defining recesses in which the bearing caps are fitted and secured to the journal walls by main connecting bolts and to the skirt walls by auxiliary connecting bolts with the bearing caps also interconnected by a bridge.

A preferred embodiment of the present invention is incorporated in a $V_6$ internal combustion engine which will be described with reference to the drawings, wherein.

Figure 1:
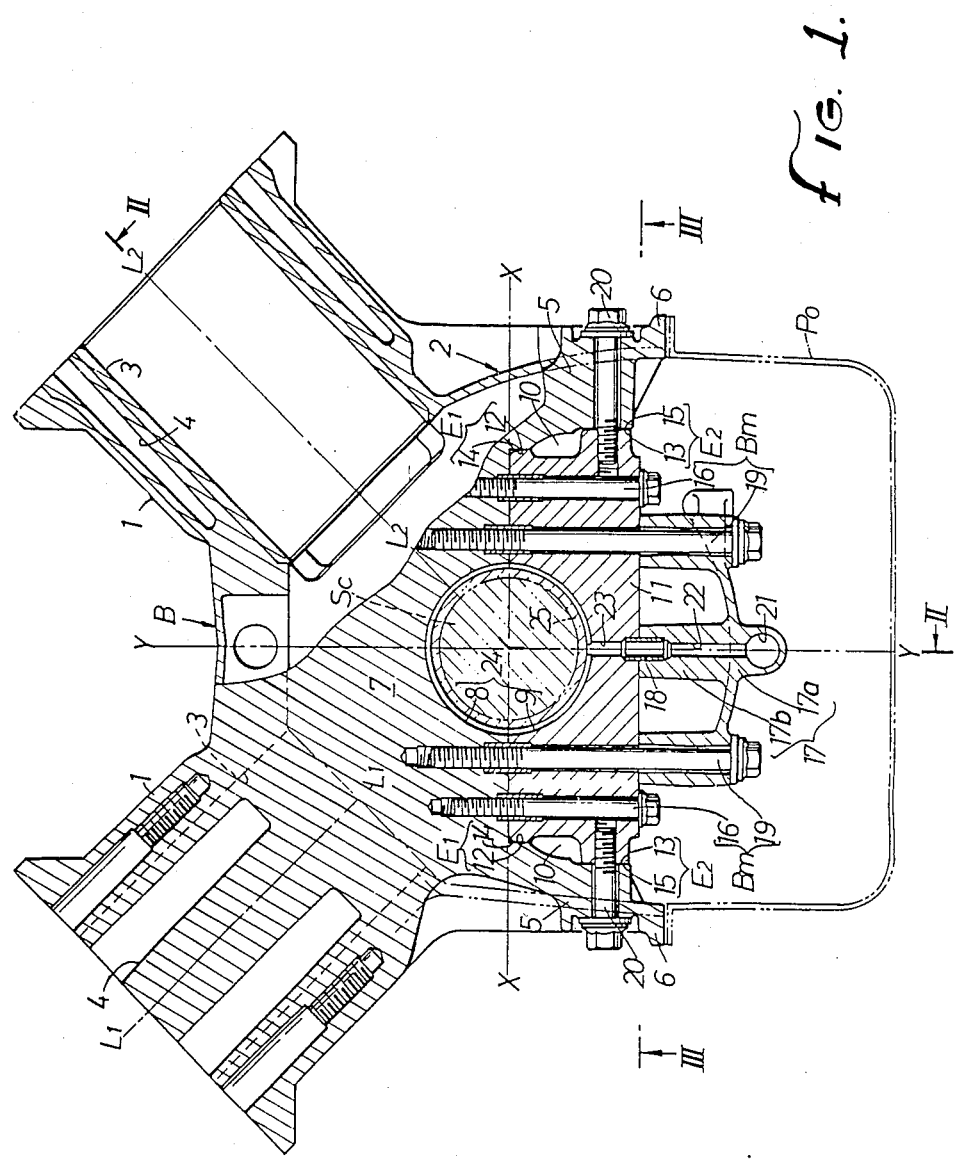
FIG. 1 is a sectional end view of a preferred embodiment of the crankshaft support structure of this invention in a cylinder block of an internal combustion engine.
Figure 2:
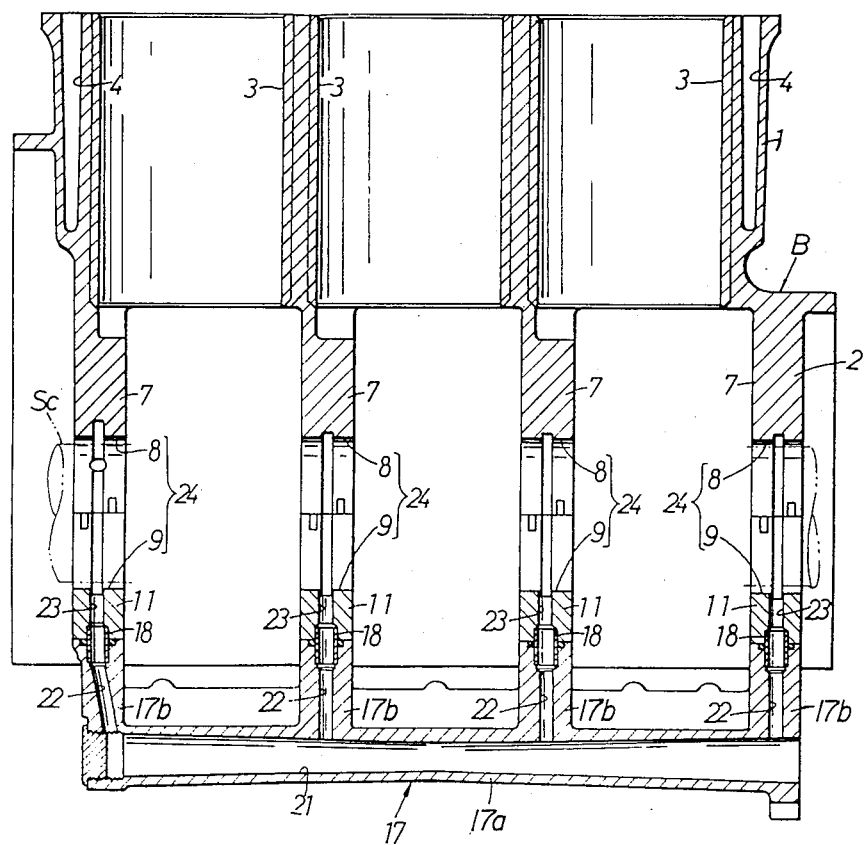
FIG. 2 is a sectional side view of the structure of FIG. 1 taken substantially on the line II—II of FIG. 1.
Figure 3:
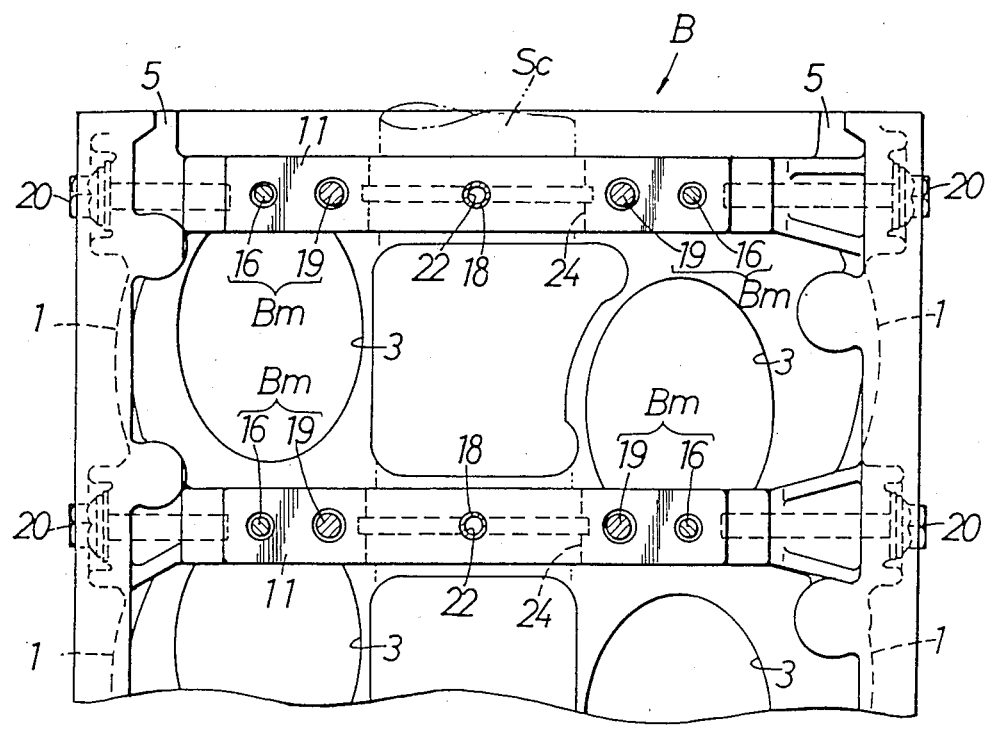
FIG. 3 is a bottom view, with portions shown in section, taken substantially on the line III—III of FIG. 1.

Referring now to FIGS. 1-3, the internal combustion engine has a cylinder block B comprising two cylinder housings 1 arranged in a V shape and a crankcase 2 integrally connecting the lower coupled portions of the cylinder housings 1. The cylinder housings 1 have inclined cylinder axes L1—L1 and L2—L2 and each housing has three in-line cylinder bores 3. The cylinder housings 1 also have water jackets 4 defined in the respective walls thereof in surrounding relation to the cylinder bores 3.

The crankcase 2 has a pair of integral downwardly extending skirt walls 5 on opposite sides of the cylinder block confronting each other and extending along a crankshaft Sc. The skirt walls 5 have integral attachment flanges 6 on their lower ends to which an oil pan Po is secured.

The crankcase 2 also includes four integral journal walls 7 spaced at intervals along the crankshaft Sc and extending laterally to the skirt walls 5. The journal walls 7 have semicircular bearing halves 8 defined in the respective lower central portions thereof for supporting the crankshaft Sc.

The crankcase 2 has a recess 10 defined in each of the journal walls 7 for receiving a bearing cap 11 therein as described below. A first pair of mating surfaces 12 are defined on the inner opposite sides of the upper portion of each recess 10, and a second pair of mating surfaces 13 are defined on inner opposite sides of the lower portion of the recess 10 in spaced relation to the first mating surfaces 12. The first mating surfaces 12 are formed as steps with horizontal and vertical surfaces located inwardly of the second mating surfaces 13, i.e., more closely to the crankshaft Sc.

Bearing caps 11, preferably of an iron alloy, are fitted respectively in the recesses 10 of the journal walls 7. Each of the bearing caps 11 has a flat upper surface held against the lower surface of one of the journal walls 7 and a semicircular bearing half 9 defined centrally in the flat upper surface thereof in registry with one of the bearing halves 8. Each bearing cap 11 has a first pair of mating surfaces 14 defined on outer opposite sides of the upper portion thereof to precisely fit into the mating surfaces 12 in the recess 10 to provide first mating portions E1.

Each bearing cap 11 also has a second pair of mating surfaces 15 defined on outer opposite sides of the lower portion thereof which mate with the second pair of mating surfaces 13 in the recess 10 to provide second mating portions E2.

The first mating surfaces 12 and 14 mate with each other across a smaller area therebetween as a close fit in the first mating portions E1, and the second mating surfaces 13 and 15 mate with each other across a larger area therebetween as a loose fit in the second mating portions E2. The bearing cap 11 has a flat lower surface positioned inwardly of the skirt walls 5.

Each bearing cap 11 is accommodated in a recess 10 with the first mating surfaces 14 on the bearing cap held in closely fitting relation to the first mating surfaces 12 on the recess and with the second mating surfaces 15 on the bearing cap in loosely fitting relation to the second mating surfaces 13 in the recess. The closely and loosely fitting engagements between the bearing caps 11 and the journal walls 7 increase their rigidity and allow the bearing caps 11 to be easily fitted against the journal walls 7.

Each bearing cap 11 is secured to a corresponding journal wall 7 by a pair of bolts 16 extending upwardly through laterally opposite portions of the bearing cap and threaded into the journal wall 7.

A bridge 17 made of a light alloy, such as an aluminum alloy, extends across and is fixed to the lower surfaces of the bearing caps 11. More specifically, the bridge 17 is composed of a main portion 17a extending along the crankshaft Sc and a plurality of legs 17b integrally projecting upwardly from the main portion 17a toward the bearing caps 11. The legs 17b have flat upper surfaces engaging the flat lower surfaces of the bearing caps 11. The bearing caps 11 and the corresponding journal walls 7 are positioned relatively to each other by tubular positioning pins 18 fitted in laterally central portions thereof and defining lubricating oil passages therethrough.

The bridge 17 and the bearing cap 11 are fastened to the corresponding journal wall 7 by a pair of longer bolts 19 extending upwardly through the bridge 17 and the bearing cap 11 and threaded into the journal wall 7. The pair of shorter bolts 16 and the pair of longer bolts 19 serve as main connecting bolts means Bm by which the bearing cap 11 is secured to the journal wall 7.

A pair of auxiliary connecting bolts 20 extend inwardly through the skirt walls 5 on opposite sides of the block B and the second mating surfaces E2 and are threaded into the lateral sides of the bearing cap 11.

The bridge 17 has a main oil passage or gallery 21 defined longitudinally through the main portion 17a, and a plurality of branch oil passages 22 extending upwardly through the legs 17b from the main gallery 21. The branch oil passages 22 communicate through the tubular positioning pins 18 with oil passages 23 in the bearing caps 11. The oil passages 23 open at the bearing surfaces of each of the bearing halves 9.

The bearing halves 8 and 9 in the journal walls 7 and the bearing caps 11 jointly define a plurality of bearing holes 24 in which journal portions of the crankshaft Sc are rotatably supported by sleeve bearings 25.

Figure 4:
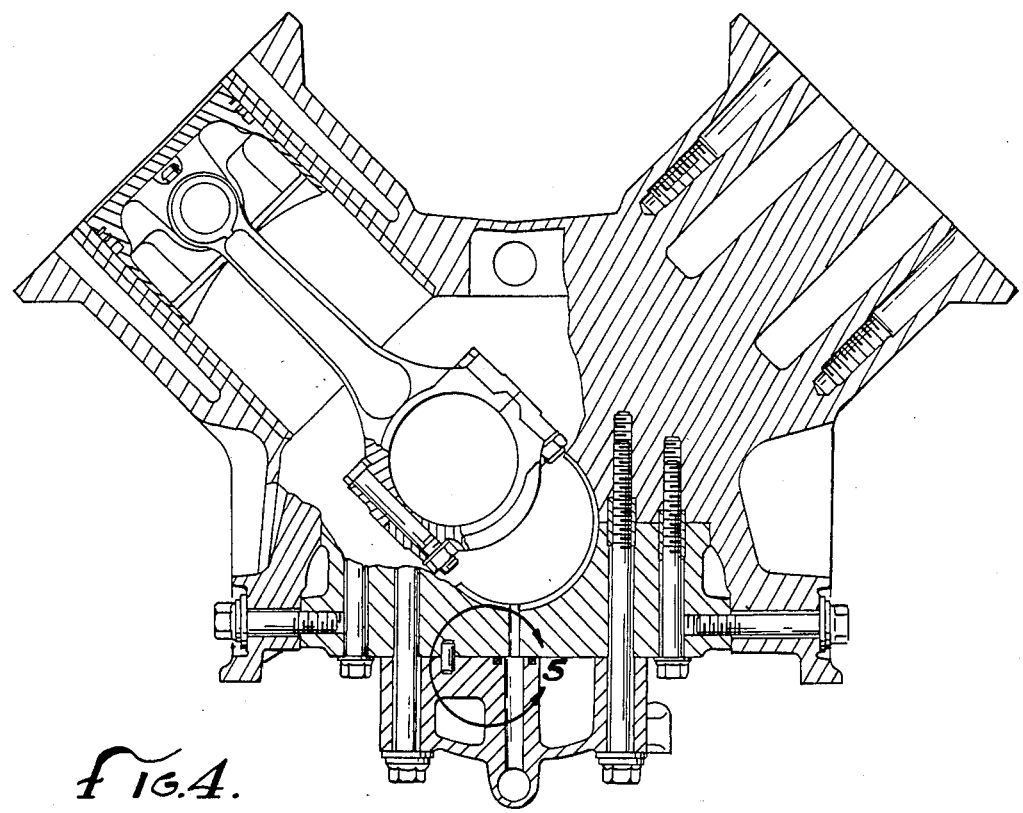
FIG. 4 is a sectional end view similar to FIG. 1 of a modification of the structure of this invention.
Figure 5:
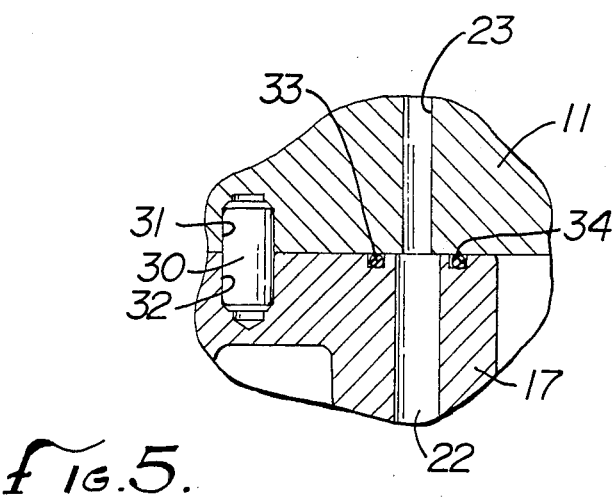
FIG. 5 is an enlarged framentary sectional view of the circled portion shown in FIG. 4 showing the modification in detail.

Referring now to FIGS. 4 and 5, a modification of a portion of the preferred embodiment is shown wherein the tubular positioning pins 18 of FIGS. 1–3 are eliminated and solid positioning pins 30 are substituted which fit in the juxtaposed bores 31 and 32 in the bearing cap 11 and bridge 17, respectively. Further, an O-ring 33 is provided in a groove 34 in bridge 17 encircling each oil branch passage 22 to seal against the lower flat surface of the bearing cap 11 to form an oil-tight connection between passage 22 and passage 23 in the bearing cap 11. In all other respects the structure of FIGS. 4 and 5 is the same as that of FIGS. 1–3.

The operation and function of the preferred embodiments of the present invention will now be described. When the internal combustion engine employing the cylinder block B is operated, the explosion pressure acting on the pistons in the cylinder bores 3 is imposed on the crankshaft Sc along the inclined cylinder axes L1—L1 and L2—L2 of the left and right cylinder housings 1. The crankshaft Sc is therefore subject to bending and twisting forces in a vertical direction (along line Y—Y of FIG. 1) and in a horizontal direction (along line X—X of FIG. 2). However, the bearing assembly for the crankshaft Sc is very rigid and can support the crankshaft Sc securely since the bearing caps 11 are fixed to the journal walls 7 by the main connecting bolts Bm and the auxiliary connecting bolts 20 and are interconnected by the bridge 17. Therefore, the crankshaft bearing assembly can withstand the external bending and twisting forces acting on the crankshaft Sc even if the external forces are increased due to an increased power output capability of the engine. Inasmuch as the bearing caps 11 are fitted in the recesses 10 of the journal walls 7 through the closely fitting engagement of the first mating surfaces E1 and the loosely fitting engagement of the second mating surfaces E2, the journal walls 7 and the bearing caps 11 are assembled with an increased strength and can be assembled easily.

Although the present invention has been described as incorporated in the V-type multicylinder internal combustion engine, the invention is also applicable to an in-line multicylinder internal combustion engine.

According to the present invention, as is clear from the foregoing description, downwardly extending skirt walls are integrally formed with journal walls of a crankcase and located one on each side of a crankshaft in confronting relation to each other. The journal walls and the skirt walls jointly define recesses in which are fitted bearing caps cooperating with the journal walls in supporting the crankshaft. The bearing caps are secured to the journal walls by main connecting bolts and to the skirt walls by auxiliary connecting bolts, and are interconnected by a bridge. Thus, the rigidity of the bearing caps and the cylinder block, especially the skirt walls, is increased to a large extent, and the bearing caps are firmly coupled together. The structure supporting the crankshaft is of an increased rigidity to enable the crankshaft to withstand the external forces, such as bending and twisting forces imposed on the crankshaft, even if they are increased due to a higher power output capability of the engine. The crankshaft can therefore be supported reliably and is allowed to rotate smoothly with reduced vibration and noise. The bearing caps and the cylinder block, especially the skirt walls, are reinforced by each other for greater rigidity to permit the bearing caps to be small in size, particularly their vertical length, and also to permit the skirt walls to be reduced in length. As a result, the engine body assembly is lighter in weight. The crankshaft supporting structure therefore is effective in increasing the power output of the engine and in attaining better fuel economy due to the reduced weight thereof.

The invention claimed is:

1. A crankshaft supporting structure for a cylinder block of an internal combustion engine, comprising, a plurality of journal walls extendng laterally across the cylinder block and bieng longitudinally spaced along the crankshaft, a recess formed in each journal wall with inwardly and downwardly facing first mating surfaces at an upper extremity of said recess, the cylinder block having skirt portions extending downwardly from the recesses on each lateral end of the journal walls, a bearing cap mounted in the recess in each journal wall and having means cooperating with the journal wall for rotatably supporting the crankshaft, each said bearing cap having outwardly and upwardly facing first first mating surfaces for engaging said journal wall first mating surfaces, mating inwardly facing vertical surfaces on each said skirt portion and outwardly facing vertical surfaces on each bearing cap, a longitudinally extending bridge, a pair of vertical bolts extending through the bridge and each bearing cap and threadedly engaging said journal wall, horizontal bolts extending through the skirt portions and threadedly engaging each lateral side of each bearing cap, and said bridge having a main oil gallery defined therein for passage of lubricating oil therethrough and communicating with lubricating oil passages formed through said bridge and said bearing caps for communicating oil to the crankshaft.

2. A crankshaft supporting structure for a cylinder block of an internal combustion engine, comprising, a plurality of journal walls extending lateraly across the cylinder block and being longitudinally spaced along the crankshaft, a recess formed in each journal wall with inwardly and downwardly facing first mating surfaces at an upper extremity of said recess, the cylinder block having skirt portions extendng downwardly from the recesses on each lateral end of the journal walls, a bearing cap mounted in the recess in each journal wall and having means cooperating with the journal wall for rotatably supporting the crankshaft, each said bearing cap having outwardly and upwardly facing first mating surfaces for engaging said journal wall first mating surfaces, mating inwardly facing vertical surfaces on each said skirt portion and outwardly facing vertical surfaces on each bearing cap, a longitudinally extending bridge, a first pair of vertical bolts extending through the bridge and each bearing cap and threadedly engaging said journal wall, a second pair of vertical bolts extending through each bearing cap and threadedly engaging said journal wall horizontal bolts extending through the skirt portions and threadedly engaging each lateral side of each bearing cap, and said bridge having a main oil gallery defined therein for passage of lubricating oil therethrough and communicating with lubricating oil passages formed through said bridge and said bearing caps for communicating oil to the crankshaft.

3. A crankshaft supporting structure in the internal combustion engine, including a plurality of journal walls integral with the crankcase of a cylinder block serving as an engine body, a plurality of bearing caps fastened to the journal walls, respectively, and a crankshaft rotatably supported jointly by the journal walls and the bearing caps, comprising, said crankcase having a pair of skirt walls extending downwardly and intergral with each of said journal walls, said skirt walls being disposed one on each side of said crankshaft in confronting relation to each other, said journal walls and said skirt walls jointly defining recesses, said bearing cap being fitted in each said recess, each said bearing cap secured to said journal walls by main connecting bolts and to said skirt walls by auxiliary connecting bolts, said bearing caps being interconnected by a bridge, and said bridge having a main oil gallery defined therein for passage of lubricating oil therethrough and communicating with lubricating oil passages formed through said bridge and said bearing caps for communicating oil to the crankshaft.

4. A crankshaft supporting structure according to claim 3, wherein said main connecting bolts include shorter bolts extending through only said bearing caps and threaded into said journal walls and longer bolts extending through said bridge and said bearng caps and threaded into said journal walls.

5. A crankshaft supporting structure according to claim 3, including first mating surfaces disposed between said bearing caps and said recesses close to said journal walls, and second mating surfaces disposed between said bearing caps and said recesses remote from said journal walls, said first and second mating surfaces having surfaces of different areas, the area of said second mating surfaces being larger than the area of said first mating surfaces.

6. A crankshaft supporting structure according to claim 3, wherein each of said bearing caps is made of an iron alloy and said bridge is made of a light metal alloy.

7. A crankshaft supporting structure for a cylinder block of an internal combustion engine, comprising, a plurality of longitudinally spaced journal walls formed in and extending laterally across said cylinder block, the cylinder block having skirt portions extending downwardly on each lateral side of said cylinder block below said journal walls, a bearing cap mounted on each journal wall for rotatably supporting the crankshaft, means connecting said skirt portions to each said bearing cap, and a bridge extending longitudinally and mounted on each of the bearing caps, said bridge having a main oil gallery defined therein for passage of lubricating oil therethrough and communicating with lubricating oil passages formed through said bridge and said bearing caps for communicating oil to the crankshaft.

8. The structure of claim 7 wherein each said journal walls has downwardly and inwardly facing mating surfaces horizontally positioned and laterally spaced on each lateral side of the crankshaft, and each bearing cap has upwardly and outwardly facing mating surfaces for engaging said journal wall mating surfaces for precisely and positively locating said bearing cap.

9. The structure of claim 7 wherein a bridge is mounted on said bearing caps by means of bolts extending through the bridge and each said bearing cap and threadedly engaging said journal walls.

10. The structure of claim 7 wherein said bearing caps have substantially vertical surfaces on each lateral side thereof and said skirt portions have substantially vertical surfaces for mating with said bearing cap surfaces.

11. The structure of claim 10 wherein said connecting means comprise bolts extending horizontally through said skirt portions and mating surfaces for threaded engagement with said bearing caps.

* * * * *